(12) United States Patent
Mullins

(10) Patent No.: US 9,898,844 B2
(45) Date of Patent: Feb. 20, 2018

(54) AUGMENTED REALITY CONTENT ADAPTED TO CHANGES IN REAL WORLD SPACE GEOMETRY

(71) Applicant: DAQRI, LLC, Los Angeles, CA (US)

(72) Inventor: Brian Mullins, Sierra Madre, CA (US)

(73) Assignee: DAQRI, LLC, Los Angeles, CA (US)

( * ) Notice: Subject to any disclaimer, the term of this patent is extended or adjusted under 35 U.S.C. 154(b) by 0 days.

(21) Appl. No.: 14/145,458

(22) Filed: Dec. 31, 2013

(65) Prior Publication Data
US 2015/0187108 A1    Jul. 2, 2015

(51) Int. Cl.
*G06T 11/60* (2006.01)
*G06T 19/00* (2011.01)

(52) U.S. Cl.
CPC ............ *G06T 11/60* (2013.01); *G06T 19/006* (2013.01); *G06T 2210/61* (2013.01)

(58) Field of Classification Search
CPC ........... G06T 5/00; G06T 15/00; G06T 15/20; G06T 13/20; G06T 13/40; G06T 11/60; G06T 2210/61; G06T 19/006; A63F 13/57
USPC .................. 345/419, 422, 629, 633
See application file for complete search history.

(56) References Cited

U.S. PATENT DOCUMENTS

| | | | | |
|---|---|---|---|---|
| 8,878,846 B1* | 11/2014 | Francis, Jr. | ........... | G06T 19/006 345/420 |
| 9,183,676 B2* | 11/2015 | McCulloch | ........... | G06T 19/006 |
| 2007/0211047 A1* | 9/2007 | Doan | ........ | A63F 1/04 345/419 |
| 2011/0109628 A1* | 5/2011 | Rurin | ........... | 345/420 |
| 2011/0316845 A1* | 12/2011 | Roberts | ................. | G06T 19/006 345/419 |
| 2013/0286004 A1* | 10/2013 | McCulloch | ........... | G06T 19/006 345/419 |
| 2013/0307875 A1* | 11/2013 | Anderson | ............. | G06T 19/006 345/633 |
| 2013/0314407 A1* | 11/2013 | Meehan | ........ | 345/419 |
| 2014/0049559 A1* | 2/2014 | Fleck | .................. | G06T 19/006 345/633 |
| 2015/0130790 A1* | 5/2015 | Vasquez, II | ........... | G06T 19/006 345/419 |

(Continued)

FOREIGN PATENT DOCUMENTS

WO    WO-2015102904 A1    7/2015

OTHER PUBLICATIONS

"International Application Serial No. PCT/US2014/070823, International Search Report dated Mar. 18, 2015", 2 pgs.

(Continued)

*Primary Examiner* — Gregory J Tryder
*Assistant Examiner* — Michael Le
(74) *Attorney, Agent, or Firm* — Schwegman Lundberg & Woessner, P.A.

(57) ABSTRACT

A system and method for augmented reality content adapted to changes in real world space geometry are described. A device captures an image of a local environment and maps a real world space geometry of the local environment using the image of the local environment. The device generates a visualization of a virtual object in the display relative to the mapped real world space geometry of the local environment. A content of the virtual object is adjusted to changes in the real world space geometry of the local environment.

19 Claims, 12 Drawing Sheets

(56) References Cited

U.S. PATENT DOCUMENTS

2015/0130836 A1* 5/2015 Anderson ............ G06T 19/006
 345/633

OTHER PUBLICATIONS

"International Application Serial No. PCT/US2014/070823, Written Opinion dated Mar. 18, 2015", 12 pgs.
"International Application Serial No. PCT/US2014/070823, International Preliminary Report on Patentability dated Dec. 14, 2015", 9 pgs.
"European Application Serial No. 14876769.2, Extended European Search Report dated Jul. 7, 2017", 12 pgs.
Rafal, Wojciechowski, et al., "Building Virtual and Augmented Reality museum exhibitions", Proc. of the 9th Intl. Conf. on 3d Web Technology; [Proceedings Web3d Symposium] ACM, Monterey, (Apr. 5, 2004), 135-144.
Van, Krevelen, et al., "A Survey of Augmented Reality Technologies, Applications and Limitations", International Journal of Virtual Reality, IPI Press, Colorado Springs, CO, US vol. 9, No. 2, (Jun. 1, 2010), 1-20.
Xiaowei, Zhong, et al., "Designing a vision-based collaborative augmented re a lity application for industrial training [Entwurf einer kollaborativen Augmented-Reality-Anwendung fur industrielles Training (Designing a Vision-based Collaborative Augmented Reality Application for In", IT—Information Technol, Oldenbourg Wissenschaftsverlag, München, DE, vol. 45, No. 1, (Feb. 1, 2003), 7-19.

* cited by examiner

AUGMENTED REALITY CONTENT ADAPTED TO CHANGES IN REAL WORLD SPACE GEOMETRY

TECHNICAL FIELD

The subject matter disclosed herein generally relates to the processing of data. Specifically, the present disclosure addresses systems and methods for adapting augmented reality content based on changes in real world space geometry.

BACKGROUND

A device can be used to generate and display data in addition to an image captured with the device. For example, augmented reality (AR) is a live, direct or indirect view of a physical, real-world environment whose elements are augmented by computer-generated sensory input such as sound, video, graphics or GPS data. With the help of advanced AR technology (e.g., adding computer vision and object recognition) the information about the surrounding real world of the user becomes interactive. Device-generated (e.g., artificial) information about the environment and its objects can be overlaid on the real world.

BRIEF DESCRIPTION OF THE DRAWINGS

Some embodiments are illustrated by way of example and not limitation in the figures of the accompanying drawings.

DETAILED DESCRIPTION

Figure 1:
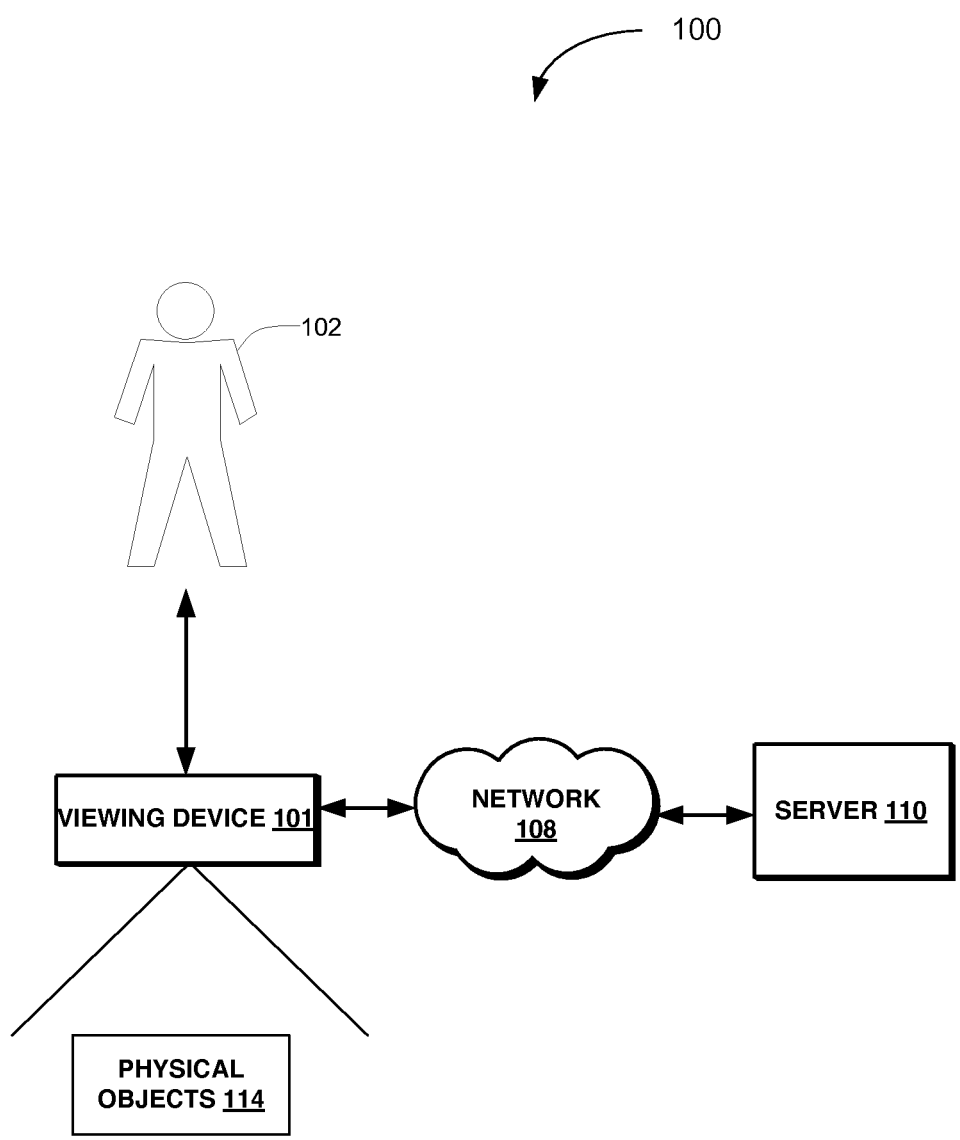
FIG. 1 is a block diagram illustrating an example of a network suitable for adapting augmented reality content based on changes in real world space geometry, according to some example embodiments.

Example methods and systems are directed to data manipulation based on real world object manipulation. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Augmented reality applications allow a user to experience information, such as in the form of a three-dimensional virtual object overlaid on an image of a physical object captured by a camera of a viewing device. The physical object may include a visual reference that the augmented reality application can identify. A visualization of the additional information, such as the three-dimensional virtual object overlaid or engaged with an image of the physical object, is generated in a display of the device. The three-dimensional virtual object may be selected based on the recognized visual reference or captured image of the physical object. A rendering of the visualization of the three-dimensional virtual object may be based on a position of the display relative to the visual reference. Other augmented reality applications allow a user to experience visualization of the additional information overlaid on top of a view or an image of any object in the real physical world. The virtual object may include a three-dimensional virtual object, a two-dimensional virtual object. For example, the three-dimensional virtual object may include a three-dimensional view of a chair or an animated dinosaur. The two-dimensional virtual object may include a two-dimensional view of a dialog box, menu, or written information such as statistics information for a baseball player. An image of the virtual object may be rendered at the viewing device.

A system and method for augmented reality content adapted to changes in real world space geometry are described. A device captures an image of a local environment and maps a real world space geometry of the local environment using the image of the local environment. The device generates a visualization of a virtual object in the display relative to the mapped real world space geometry of the local environment. Content of the virtual object is adjusted to changes in the real world space geometry of the local environment.

In one example embodiment, the device has an optical sensor that captures an image of a local environment. The real world space geometry of the local environment is mapped using the image of the local environment. The device generates a visualization of a virtual object in the display relative to the mapped real world space geometry of the local environment. Content of the virtual object is adjusted to changes in the real world space geometry of the local environment.

In one example embodiment, the local environment comprises scenery captured with the optical sensor. The scenery may include real world physical objects. The device may identify features points of the real world physical objects and use the feature points to identify the real world physical objects. The device then maps the real world space geometry using the feature points of the plurality of real world physical objects. The device identifies the virtual object and a corresponding behavior of the virtual object relative to the identified real world physical objects.

In another example embodiment, the device identifies a physical change in the real world space geometry based on the mapped real world space geometry, and modifies the content of the virtual object in response to the physical change in the real world space geometry of the local environment.

The physical change may include a change in a location of a real world physical object within the scenery, a removal of a real world physical object from the scenery, or an addition of a new real word physical object to the scenery.

The device can modify the content of the virtual object by modifying a display and a behavior of the virtual object in response to the physical change. In another example, the device can modify the size, shape, and location of the virtual object in the display in relation to the change in the location of the real world physical object within the scenery and the behavior of the virtual object in relation to the change in the location of the real world physical object within the scenery.

In another example embodiment, the device can dynamically generate a new behavior for the virtual object in response to the physical change in the real world space geometry of the local environment using a library of virtual object alternative behaviors.

In another example embodiment, the device can generate a physical change identifier in response to the physical change in the real world space geometry of the local environment. For example, the physical change identifier identifies the set and location of physical objects in the scenery. The physical change identifier is communicated to a server. The device receives from the server a new behavior model for the virtual object corresponding to the physical change identifier and modifies a behavior of the virtual object based on the new behavior model.

In one example embodiment, the device includes a display configured to display the visualization of the virtual object in a transparent display. A position and size of the visualization of the virtual object in the transparent display may be based on a position and orientation of the viewing device relative to the scenery.

In another example embodiment, a non-transitory machine-readable storage device may store a set of instructions that, when executed by at least one processor, causes the at least one processor to perform the method operations discussed within the present disclosure.

FIG. 1 is a network diagram illustrating a network environment 100 suitable for operating an augmented reality application of a device, according to some example embodiments. The network environment 100 includes a viewing device 101 and a server 110, communicatively coupled to each other via a network 108. The viewing device 101 and the server 110 may each be implemented in a computer system, in whole or in part, as described below with respect to FIGS. 2 and 5.

The server 110 may be part of a network-based system. For example, the network-based system may be or include a cloud-based server system that provides additional information, such as three-dimensional models, to the viewing device 101.

A user 102 may utilize the viewing device 101 to capture a view of scenery made up of physical objects (e.g., a bridge) or subjects (e.g., a human being) in a local real world environment. The user 102 may be a human user (e.g., a human being), a machine user (e.g., a computer configured by a software program to interact with the viewing device 101), or any suitable combination thereof (e.g., a human assisted by a machine or a machine supervised by a human). The user 102 is not part of the network environment 100, but is associated with the viewing device 101 and may be a user 102 of the viewing device 101. For example, the viewing device 101 may be a computing device with a display such as a smartphone, a tablet computer, or a wearable computing device (e.g., watch or glasses). The computing device may be hand held or may be removably mounted to a head of the user 102. In one example, the display may be a screen that displays what is captured with a camera of the viewing device 101. In another example, the display of the viewing device 101 may be transparent or semi-transparent such as in lenses of wearable computing glasses.

The user 102 may be a user of an augmented reality application in the viewing device 101 and at the server 110. The augmented reality application may provide the user 102 with a virtual experience triggered by a subject, a physical object in a scene, such as, a two-dimensional physical object (e.g., a picture), a three-dimensional physical object (e.g., a factory machine), a location (e.g., at the bottom floor of a factory), or any references (e.g., perceived corners of walls or furniture) in the real world physical environment. For example, the user 102 may point a camera of the viewing device 101 to capture an image of a scenery made up of physical objects 114. For example, the viewing device 101 may be pointed to the interior of a room having several pieces of furniture. The viewing device 101 maps the space geometry of the room so as to identify the physical objects 114 (e.g., furniture) and determine their relative locations to each other or within the scenery. The viewing device 101 uses the mapped space geometry of the room generate a visualization of a virtual character (e.g., cartoon) in the display of the viewing device 101 such that the virtual character interacts with the real world environment. For example, the viewing device 101 may show the virtual character sitting at one of the chairs in the room or walking around the room and avoiding walking through or bumping into the pieces of furniture. The viewing device 101 may detect a change in the real world space geometry such as a chair being moved in the scenery. The viewing device 101 can then adjust the behavior of the virtual character based on the new chair location. For example, the virtual character may walk up to the chair in the new location and sit on it, may speak up or act up when the chair is removed from the room, may walk within the display without bumping into the chair at the new location, etc.

In one embodiment, the image is tracked and recognized locally in the viewing device 101 using a local context recognition dataset or any other previously stored dataset of the augmented reality application of the viewing device 101. The local context recognition dataset module may include a library of virtual objects associated with real-world physical objects or references. In one example, the viewing device 101 identifies feature points in an image of a physical object 114 to determine different planes (e.g., edges, corners, surface of the machine). The viewing device 101 also identifies tracking data related to the physical object 114 (e.g., GPS location of the viewing device 101, direction of the viewing device 101, e.g., viewing device 101 standing x meters away from a door or the entrance of a room). If the captured image is not recognized locally at the viewing device 101, the viewing device 101 downloads additional information (e.g., the three-dimensional model) corresponding to the captured image, from a database of the server 110 over the network 108.

In another embodiment, the image is tracked and recognized remotely at the server 110 using a remote context recognition dataset or any other previously stored dataset of an augmented reality application in the server 110. The remote context recognition dataset module may include a library of virtual objects associated with real-world physical objects or references.

In one embodiment, the viewing device 101 may use internal or external sensors to track the location and orientation of the viewing device 101 relative to the physical objects 114. The sensors may include optical sensors (e.g., depth-enabled 3D camera), wireless sensors (Bluetooth, Wi-Fi), GPS sensor, and audio sensor to determine the location of the user 102 having the viewing device 101, distance of the user 102 to the tracking sensors in the physical environment (e.g., sensors placed in corners of a venue or a room), the orientation of the viewing device 101 to track what the user 102 is looking at (e.g., direction at which the viewing device 101 is pointed, e.g., viewing device 101 pointed towards a player on a tennis court, viewing device 101 pointed at a person/object in a room).

In another embodiment, data from the sensors in the viewing device 101 may be used for analytics data processing at the server 110 for analysis on usage and how the user 102 is interacting with the physical environment. For example, the analytics data may track at what locations (e.g., points or features) on the physical or virtual object the user 102 has looked, how long the user 102 has looked at each location on the physical or virtual object, how the user 102 held the viewing device 101 when looking at the physical or virtual object, which features of the virtual object the user 102 interacted with (e.g., such as whether a user 102 tapped on a link in the virtual object), and any suitable combination thereof. The viewing device 101 receives a visualization content dataset related to the analytics data. The viewing device 101 then generates a virtual object with additional or visualization features, or a new experience, based on the visualization content dataset.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIGS. 8, 9, and 10. As used herein, a "database" is a data storage resource and may store data structured as a text file, a table, a spreadsheet, a relational database (e.g., an object-relational database), a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 108 may be any network that enables communication between or among machines (e.g., server 110), databases, and devices (e.g., viewing device 101). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Figure 2:
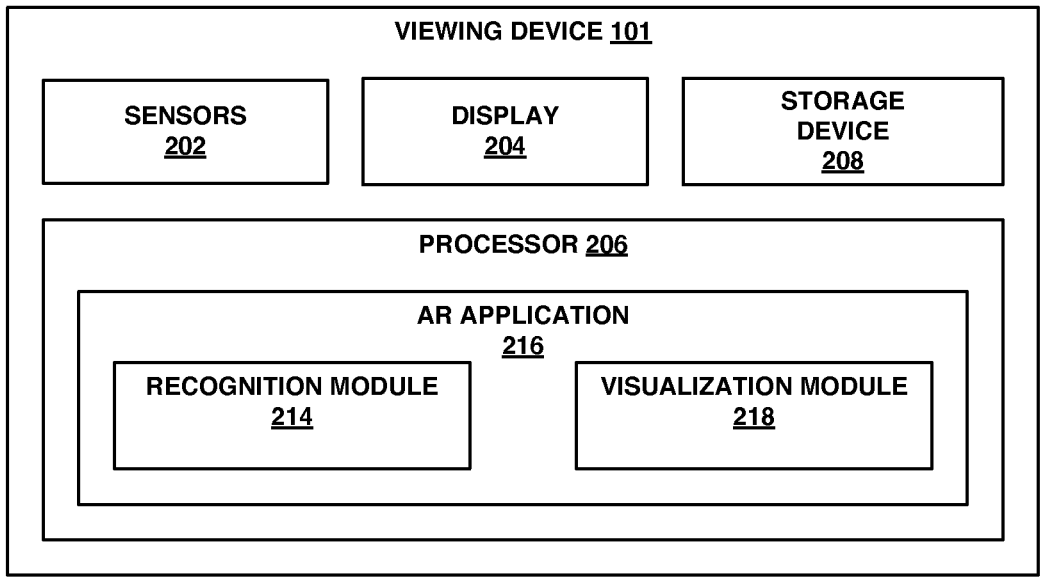
FIG. 2 is a block diagram illustrating an example embodiment of modules (e.g., components) of a viewing device.

FIG. 2 is a block diagram illustrating modules (e.g., components) of the viewing device 101, according to some example embodiments. The viewing device 101 may include sensors 202, a display 204, a processor 206, and a storage device 208. For example, the viewing device 101 may be a wearing computing device, desktop computer, a vehicle computer, a tablet computer, a navigational device, a portable media device, or a smart phone of a user (e.g., user 102). The user may be a human user (e.g., a human being), a machine user (e.g., a computer configured by a software program to interact with the viewing device 101), or any suitable combination thereof (e.g., a human assisted by a machine or a machine supervised by a human).

The sensors 202 may include, for example, a proximity or location sensor (e.g., Near Field Communication, GPS, Bluetooth, Wi-Fi), an optical sensor (e.g., camera), an orientation sensor (e.g., gyroscope), an audio sensor (e.g., a microphone), or any suitable combination thereof. For example, the sensors 202 may include a rear facing camera and a front facing camera in the viewing device 101. It is noted that the sensors 202 described herein are for illustration purposes; the sensors 202 are thus not limited to the ones described. The sensors 202 may be used to generate internal tracking data of the viewing device 101 to determine what the viewing device 101 is capturing or looking at in the real physical world.

The display 204 may include, for example, a touchscreen display configured to receive a user input via a contact on the touchscreen display. In one example, the display 204 may include a screen or monitor configured to display images generated by the processor 206. In another example, the display 204 may be transparent or semi-opaque so that the user can see through the display 204 (e.g., Head-Up Display).

The processor 206 may include an augmented reality application 216 for generating a visualization of a virtual object in the display 204 when the viewing device 101 captures an image of real world scenery comprising physical objects and people. The virtual object may be based on at least one of the physical objects and person in the scenery. For example, the virtual object may be a virtual character based on an arrangement of the physical objects in the scenery, the identity of at least one physical object or person, or any other unique identifiers in the scenery. The augmented reality application 216 may display the virtual object in the display 204 in relation to a display of the scenery in the display 204. For example, the virtual object may rest on one of the physical objects. The augmented reality application 216 generates an animation or behavior of the virtual object to be adapted to the physical objects in the scenery. For example, the virtual object may bounce from one physical object to another physical object in the scenery. The behavior of the physical object may change based on any changes to the physical objects in the scenery. For example, a chair is removed from the scenery. The virtual object then bounces on the floor instead of on the chair.

In one example embodiment, the augmented reality application 216 may include a recognition module 214 and a visualization module 218.

Figure 3:
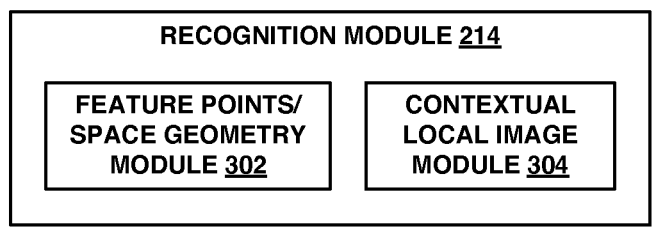
FIG. 3 is a block diagram illustrating an example embodiment of modules of a recognition module.

The recognition module 214 identifies physical objects (e.g., physical objects 114) that the viewing device 101 is pointed to. The recognition module 214 may detect, generate, and identify identifiers such as feature points of the physical objects being viewed or pointed at by the viewing device 101 using an optical device of the viewing device 101 to capture the image of the physical objects. As such, the recognition module 214 may be configured to identify a physical object, a set of physical objects, or a pattern or layout of the physical objects. In one example embodiment, the recognition module 214 may include a feature points module 302 and a contextual local image module 304 as illustrated in FIG. 3. The feature points module 302 may map the space geometry of the scenery by recognizing physical objects and their respective locations in the scenery. The identification of the objects may be performed in many ways. For example, the feature points module 302 may determine feature points of the object based on several image frames of object. The feature points module 302 also determines the identity of the object using any visual recognition algorithm. In other example, a unique identifier may be associated with the object and any element in the scenery (e.g., a room may have a unique layout or pattern using detected corners). For example, the space geometry of the room may be mapped out using the detected corners. In another example, the viewing device may be pointed at a road or freeway. The space geometry of the scenery may be mapped based on the pattern of the road or freeway. The space geometry provides a scale of the scenery to the visualization module 218.

The unique identifier may be a unique wireless signal or a unique visual pattern such that the recognition module 214 can look up the identity of the object or the scenery based on the unique identifier from a local or remote content database. In another example embodiment, the recognition module 214 includes a facial recognition algorithm to determine an identity of a subject.

The contextual local image module 304 may be configured to determine whether the captured image matches an image locally stored in a local database of images and corresponding additional information (e.g., three-dimensional model and interactive features) on the device 101. In one embodiment, the contextual local image module 304 retrieves a primary content dataset from the server 110, and generates and updates a contextual content dataset based on an image captured with the viewing device 101.

The visualization module 218 may generate one or more virtual objects based on the layout of the scenery and feature points of physical objects identified in the scenery. For example, the size of a table, a door, or any physical object may be determined according to the identity of the detected physical objects in relation to one another so that the displayed size of a virtual object may be rendered in proportion to the physical objects (e.g., the height of a virtual character may be two third the height of a door in the scenery; the physical characteristics of the virtual character are scaled in relation to the size of the identified physical objects in the scenery being viewed).

In one example embodiment, the visualization module 218 generates a visualization of the virtual objects in relation to a display of the physical objects. The visualization may include rendering a three-dimensional object (e.g., a model of a beating heart) or a two-dimensional object (e.g., arrow or symbols). In one example embodiment, the visualization module 218 receives data from the server 110 to render the visualization. In another example embodiment, the visualization module 218 receives the rendered object. The visualization module 218 further determines the position and size of the rendered object to be displayed in relation to an image of the object. For example, the visualization module 218 places an animated heart with the size and position based on the image of a subject in the scenery such that the animated heart is displayed on the chest of the subject with the size scaled relative to the size of the chest of the subject. The visualization module 218 may track the image of the subject and render the virtual object based on the position of the image of the subject in a display of the viewing device 101, or based on the position of the viewing device 101 in relation to the scenery.

Figure 4:
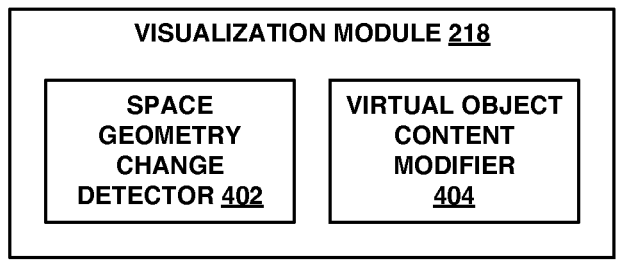
FIG. 4 is a block diagram illustrating an example embodiment of modules of a visualization module.

In one example embodiment, the visualization module 218 may include a space geometry change detector 402 and a virtual object content modifier 404 as illustrated in FIG. 4. The space geometry change detector 402 determines a change in the layout or pattern of the physical objects in the real world scenery. For example, a chair may be moved from the right side of the door to the left side of the door. A table may be removed from the scenery. A lamp may be added to the scenery. Changes may include modification of location or size of the physical objects, addition of new physical objects, removal of existing physical objects already identified in the scenery.

The virtual object content modifier 404 may change the shape, size, and behavior of the virtual object based on the new space geometry or the change in the real world scenery. For example, the virtual object may include a virtual character that speaks to an identified real world subject (e.g., human being) in the scenery. The head of the virtual object may move based on the location of the identified real world subject in the scenery. As such, if the subject moves from one location to another, the virtual object content modifier 404 may change the animation of the virtual character to move its head towards the new location of the real world subject. The behavior of the virtual character may also be modified accordingly. For example, a scripted dialogue of the virtual character may be associated with a first identified real world subject. Another scripted dialogue may be triggered when a second identified real world subject enters the scenery. The predefined behavior of the virtual character may include the virtual character walking around the scenery and avoiding walking into physical objects. For example, if another chair is added, the virtual character may walk around the new chair or sit on the new chair. As such, the virtual object such as a virtual character may behave, say, or move, based on the changes to the space geometry of the room as detected by the space geometry change detector 402.

In another example embodiment, a virtual character may be associated with a first content in response to a first scenery. When a change occurs to the first scenery that generates a second scenery, the virtual object content modifier 404 may modify the first content or generate a second content for the virtual character based on the second scenery. For example, the size, shape, animation, sound, and movement of the virtual object may change based on the second scenery. The virtual object may disappear or be replaced with another virtual object or other virtual objects may appear.

In one example embodiment, the viewing device 101 accesses, from a local memory, a visualization model (e.g., vector shapes) corresponding to the image of the virtual object. In another example, the viewing device 101 receives a visualization model corresponding to the image of the object from the server 110. The viewing device 101 then renders the visualization model to be displayed in relation to an image of the physical object being displayed in the viewing device 101 or in relation to a position and orientation of the viewing device 101 relative to the object. The augmented reality application 216 may adjust a position of the rendered visualization model in the display 204 to correspond with the last tracked position of the object (as last detected either from the sensors 202 of viewing device 101 or from the tracking sensors of the server 110).

The visualization module 218 may include a local rendering engine that generates a visualization of a three-dimensional virtual object overlaid (e.g., superimposed upon, or otherwise displayed in tandem with) on an image of a physical object captured by a camera of the viewing device 101 in the display 204 of the viewing device 101. A visualization of the three-dimensional virtual object may be manipulated by adjusting a position of the physical object (e.g., its physical location, orientation, or both) relative to the camera of the viewing device 101. Similarly, the visualization of the three-dimensional virtual object may be manipulated by adjusting a position camera of the viewing device 101 relative to the physical object.

In one example embodiment, the visualization module 218 may retrieve three-dimensional models of virtual objects associated with a captured image of a real world object. For example, the captured image may include a visual reference (also referred to as a marker) that consists of an identifiable image, symbol, letter, number, machine-readable code. For example, the visual reference may include a bar code, a quick response (QR) code, or an image that has been previously associated with a three-dimensional virtual object (e.g., an image that has been previously determined to correspond to the three-dimensional virtual object).

In one example embodiment, the visualization module 218 may include a manipulation module that identifies the physical object (e.g., a physical telephone), accesses virtual functions (e.g., increase or lower the volume of a nearby television) associated with physical manipulations (e.g., lifting a physical telephone handset) of the physical object, and generates a virtual function corresponding to a physical manipulation of the physical object.

The storage device 208 may be configured to store a database of identifiers of physical objects, scenery layout, feature points, tracking data, and corresponding virtual objects and behavior models. In another embodiment, the storage device 208 may also include visual references (e.g., images) and corresponding experiences (e.g., three-dimensional virtual objects, interactive features of the three-dimensional virtual objects). For example, the visual reference may include a machine-readable code or a previously identified image (e.g., a picture of a shoe). The previously identified image of the shoe may correspond to a three-dimensional virtual model of the shoe that can be viewed from different angles by manipulating the position of the viewing device 101 relative to the picture of the shoe. Features of the three-dimensional virtual shoe may include selectable icons on the three-dimensional virtual model of the shoe. An icon may be selected or activated by tapping or moving on the viewing device 101.

In one embodiment, the storage device 208 includes a primary content dataset, a contextual content dataset, and a visualization content dataset. The primary content dataset includes, for example, a first set of images and corresponding experiences (e.g., interaction with three-dimensional virtual object models). For example, an image may be associated with one or more virtual object models. The primary content dataset may include a core set of images or the most popular images determined by the server 110. The core set of images may include a limited number of images identified by the server 110. For example, the core set of images may include the images depicting covers of the ten most popular magazines and their corresponding experiences (e.g., virtual objects that represent the ten most popular magazines). In another example, the server 110 may generate the first set of images based on the most popular or often scanned images received at the server 110. Thus, the primary content dataset does not depend on objects or images scanned by the recognition module 214 of the viewing device 101.

The contextual content dataset includes, for example, a second set of images and corresponding experiences (e.g., three-dimensional virtual object models) retrieved from the server 110. For example, images captured with the viewing device 101 that are not recognized (e.g., by the server 110) in the primary content dataset are submitted to the server 110 for recognition. If the captured image is recognized by the server 110, a corresponding experience may be downloaded at the viewing device 101 and stored in the contextual content dataset. Thus, the contextual content dataset relies on the context in which the viewing device 101 has been used. As such, the contextual content dataset depends on objects or images scanned by the recognition module 214 of the viewing device 101.

In one embodiment, the viewing device 101 may communicate over the network 108 with the server 110 to retrieve a portion of a database of visual references, corresponding three-dimensional virtual objects, and corresponding interactive features of the three-dimensional virtual objects. The network 108 may be any network that enables communication between or among machines, databases, and devices (e.g., the viewing device 101). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 5:
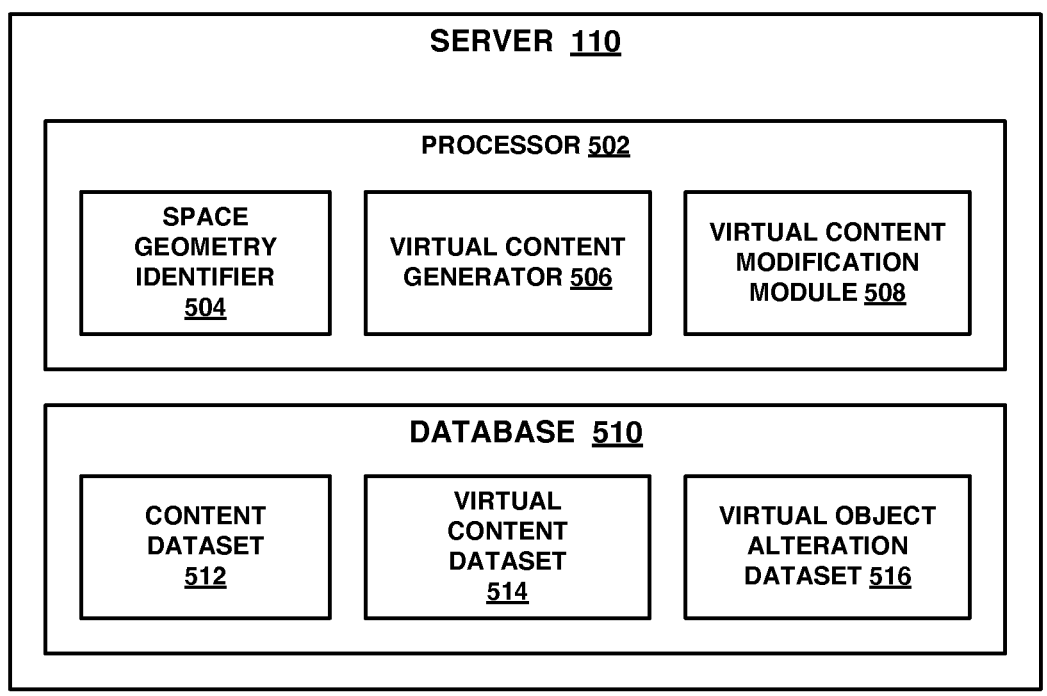
FIG. 5 is a block diagram illustrating an example embodiment of modules of a server.

FIG. 5 is a block diagram illustrating modules (e.g., components) of the server 110. The server 110 includes a processor 502 and a database 510. The processor 502 may include a space geometry identifier 504, a virtual content generator 506, and a virtual content modification module 508. The space geometry identifier 504 may operate similarly to the recognition module 214 of the viewing device 101. For example, the space geometry identifier 504 may identify an object/subject, features points, a layout of scenery based on a picture or video frame being received from the viewing device 101. In another example, the viewing device 101 already has identified the object/subject/scenery and has provided the identification information to the space geometry identifier 504.

The virtual content generator 506 generates a virtual object based on the identified real world physical objects in the scenery as identified in the space geometry identifier 504. For example, the virtual content generator 506 may generate a virtual character for a particular room being viewed by the viewing device 101. The virtual content generator 506 may specify what the virtual character looks like and what animation or behaviors are to be rendered for the virtual character based on the room and/or physical objects in the room.

The virtual content modification module 508 may determine that the space geometry of a scene has changed. For example, a different room is being viewed, or the physical objects in the room have been moved. The virtual content modification module 508 may thus dynamically generate a new set of content for the virtual object or character being displayed. In another embodiment, the virtual content modification module 508 may retrieve another set of content based on the new space geometry. For example, if real world physical objects A, B, and C are present in the scenery, the virtual object is to behave according to animation X. For example, if only real world physical objects A and B are present, the virtual object is to behave according to animation Y. For example, if real world physical objects A and B are moved from location a1 and b1 to a2 and b2, the virtual object is to behave according to animation Z. As such, the virtual content modification module 508 may generate new animation and behavior for the virtual object or may retrieve predefined animation and behavior associated with corresponding predefined space geometry. The virtual content modification module 508 may change the content of the virtual object by replacing it with another set of virtual objects.

The database 510 may store a content dataset 512, a virtual content dataset 514, and virtual object alteration dataset 516. The content dataset 512 may store a primary content dataset and a contextual content dataset. The primary content dataset comprises a first set of images and corresponding virtual object models. The virtual content generator 506 determines that a captured image received from the viewing device 101 is not recognized in the content dataset 512, and generates the contextual content dataset for the viewing device 101. The contextual content dataset may include a second set of images and corresponding virtual object models. The virtual content dataset 514 includes models of virtual objects to be generated upon receiving a notification associated with an image of a corresponding physical object, scenery, features points in the scenery, an identifier associated with the scenery, a layout, or a set of physical objects. The virtual object alteration dataset 516 includes a table of identified objects/subjects/scenery/space geometry with corresponding virtual objects content (e.g., shape, size, behavior, color, type of virtual object, etc.)

Figure 6:
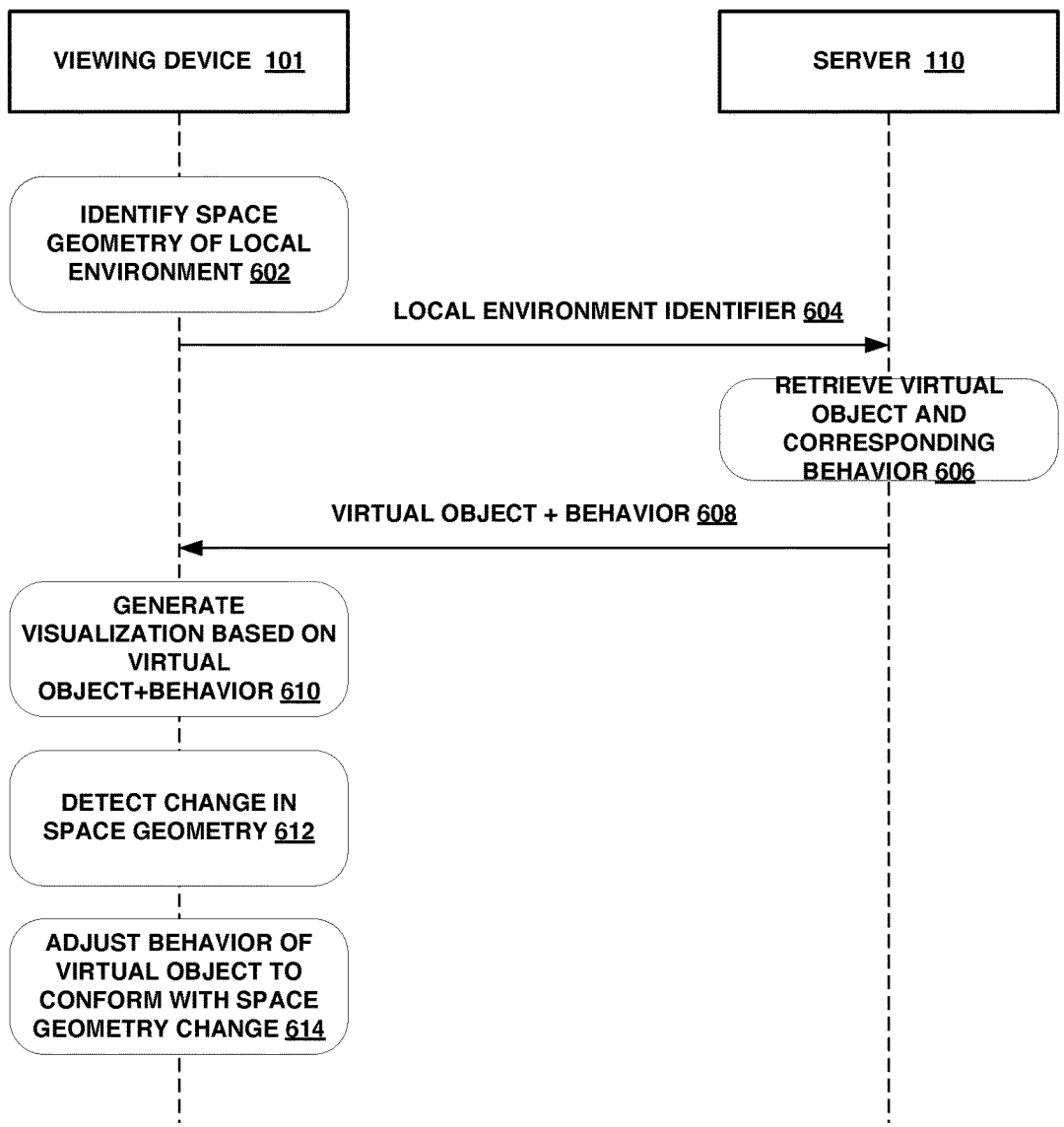
FIG. 6 is a ladder diagram illustrating an example embodiment of adapting augmented reality content based on changes in real world space geometry.

FIG. 6 is a ladder diagram illustrating an example embodiment of a system for augmented reality content changes adapted to changes in real world space geometry. At operation 602, the viewing device 101 identifies one or more real world objects, scenery, or a space geometry of the scenery, and a layout of the real world objects captured by an optical device of the viewing device 101. The viewing device 101 generates or identifies an identity of a local environment being captured by the viewing device 101. The local environment may include physical objects viewable by the viewing device 101 or within a predefined distance to the viewing device 101. The identity of the local environment may include, for example, "room 1a" as identified based on the location of the viewing device 101, or "layout 123" based on the identity and/or layout of the real world objects in a room. At operation 604, the viewing device 101 communicates the identity of the local environment to the server 110.

At operation 606, the server 110 retrieves virtual content including one or more virtual objects and corresponding behavior corresponding to the identity of the local environment. At operation 608, the server 110 sends virtual content back to the viewing device 101. At operation 610, the viewing device 101 generates a visualization of the virtual object in a display of the viewing device 101 based on the virtual content. At operation 612, the viewing device 101 detects a change in the space geometry of the scenery and modifies the virtual content accordingly at operation 614.

Figure 7:
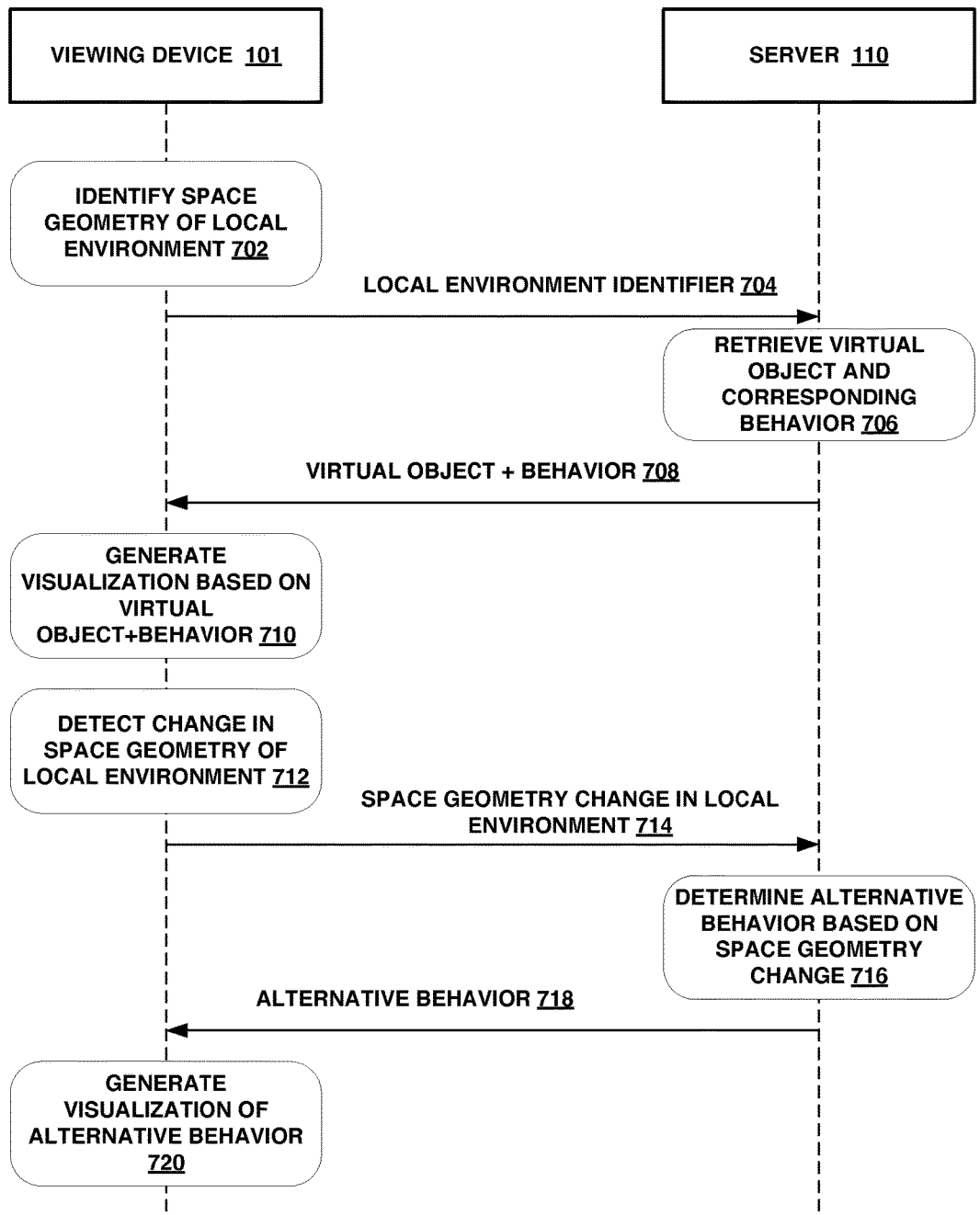
FIG. 7 is a ladder diagram illustrating another example embodiment of adapting augmented reality content based on changes in real world space geometry.

FIG. 7 is a ladder diagram illustrating an example embodiment for augmented reality content changes adapted to changes in real world space geometry. At operation 702, the viewing device 101 identifies one or more real world objects, scenery, or a space geometry of the scenery, and a layout of the real world objects captured by an optical device of the viewing device 101. The viewing device 101 generates or identifies an identity of a local environment being captured by the viewing device 101. The local environment may include physical objects viewable by the viewing device 101 or within a predefined distance to the viewing device 101. The identity of the local environment may include, for example, "room 1a" as identified based on the location of the viewing device 101, or "layout 123" based on the identity and/or layout of the real world objects in a room. At operation 704, the viewing device 101 communicates the identity of the local environment to the server 110.

At operation 706, the server 110 retrieves virtual content including one or more virtual objects and corresponding behavior corresponding to the identity of the local environment. At operation 708, the server 110 sends virtual content back to the viewing device 101. At operation 710, the viewing device 101 generates a visualization of the virtual object in a display of the viewing device 101 based on the virtual content. At operation 712, the viewing device 101 detects a change in the space geometry of the scenery and communicates the change in the space geometry to the server 110 at operation 714. At operation 716, the server 110 determines an alternative behavior for the virtual object based on the new space geometry. At operation 718, the server 110 communicates the alternative behavior to the viewing device 101. At operation 720, the viewing device 101 generates a visualization of the alternative behavior for the virtual content.

Figure 8:
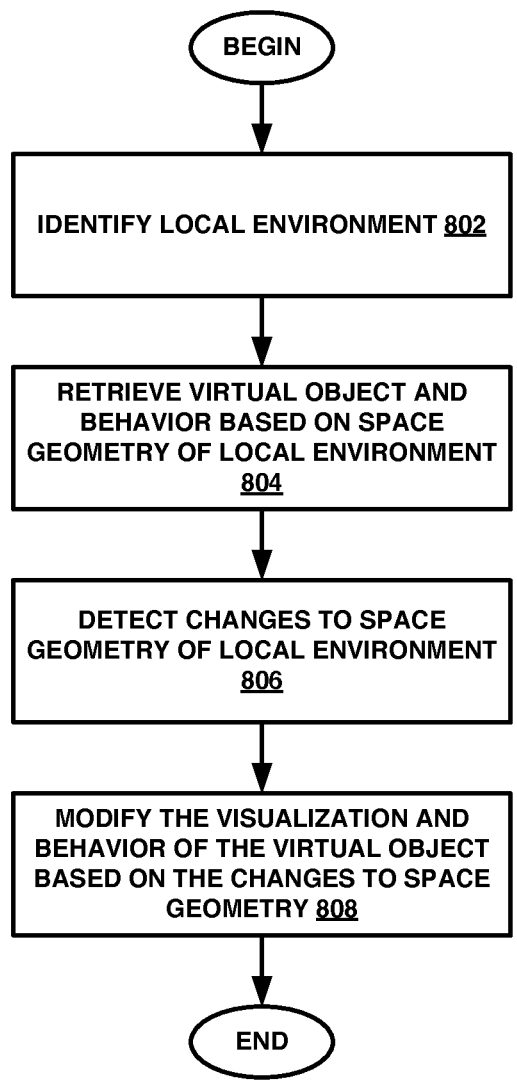
FIG. 8 is a flowchart illustrating an example operation of adapting augmented reality content based on changes in real world space geometry.

FIG. 8 is a flowchart illustrating an example operation for augmented reality content changes adapted to changes in real world space geometry at a viewing device. At operation 802, the viewing device identifies a local environment. At operation 804, the viewing device retrieves one or more virtual objects and corresponding behavior based on the space geometry of the local environment. At operation 806, the viewing device detects changes to the space geometry of the local environment. At operation 808, the viewing device modifies the visualization and behavior of the virtual object based on the changes to the space geometry of the local environment.

Figure 9:
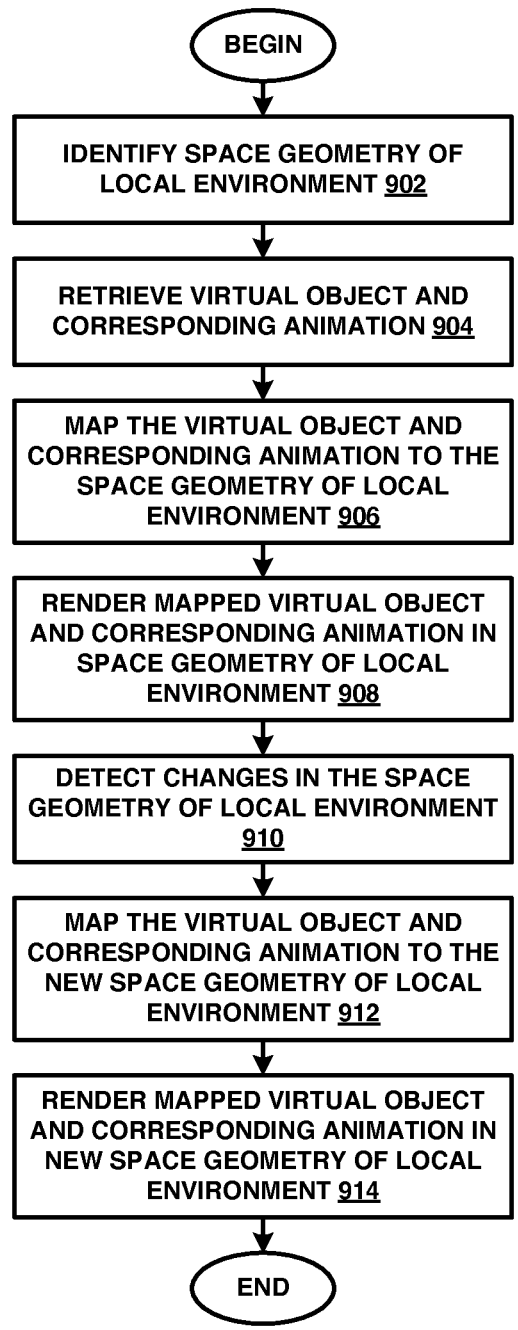
FIG. 9 is a flowchart illustrating another example operation of adapting augmented reality content based on changes in real world space geometry.

FIG. 9 is a flowchart illustrating an example operation for augmented reality content changes adapted to changes in real world space geometry at a viewing device. At operation 902, the viewing device identifies a space geometry of the local environment. At operation 904, the viewing device retrieves one or more virtual object and their corresponding animation and behavior. At operation 906, the viewing device maps the virtual object and corresponding animation to the space geometry of the local environment. At operation 908, the viewing device renders the mapped virtual object and corresponding animation in the space geometry of the local environment. At operation 910, the viewing device detects changes in the space geometry of the local environment. At operation 912, the viewing device maps the virtual object and corresponding animation to the new space geometry of the local environment. At operation 914, the viewing device renders the mapped virtual object and corresponding animation in the new space geometry of the local environment.

Figure 10:
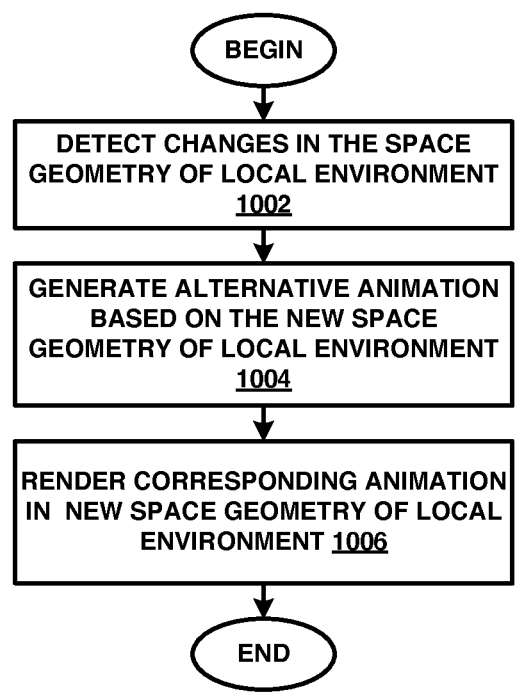
FIG. 10 is a flowchart illustrating another example operation of adapting augmented reality content based on changes in real world space geometry.

FIG. 10 is a flowchart illustrating an example operation for augmented reality content changes adapted to changes in real world space geometry at a viewing device. At operation 1002, the viewing device detects changes in the space geometry of the local environment. At operation 1004, the viewing device generates an alternative animation based on the new space geometry of the local environment. At operation 1006, the viewing device renders the corresponding animation in the new space geometry of the local environment.

Figure 11A:
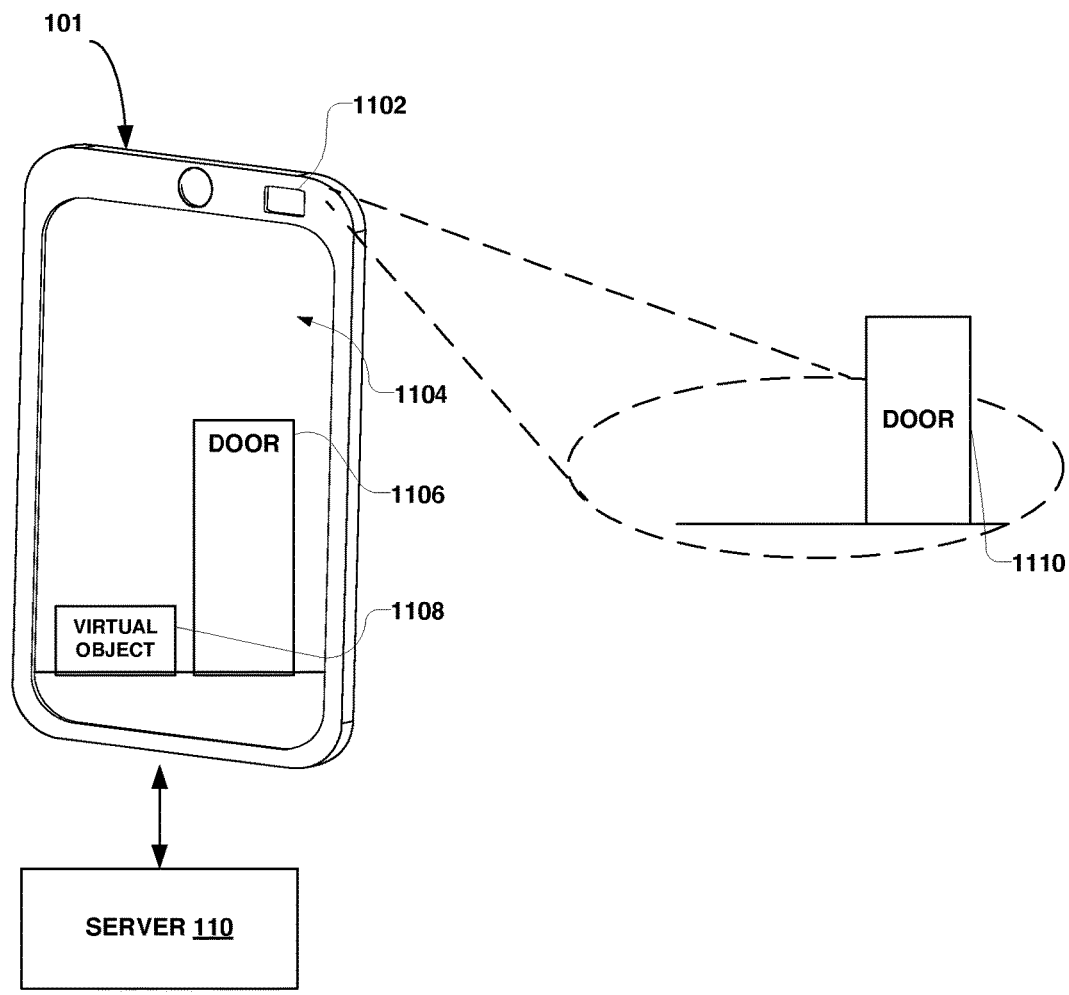
FIG. 11A is a diagram illustrating an example operation of adapting augmented reality content based on changes in real world space geometry.

FIG. 11A is a diagram illustrating an example operation of augmented reality content changes adapted to changes in real world space geometry. The viewing device 101 may include a handheld mobile device having a rear view camera 1102 and a touch sensitive display 1104. The viewing device 101 may be pointed at a real world physical door 1110. The rear view camera 1102 captures an image of the door 1110 and displays a picture 1106 of the door 1110 in the display 1104. Identifiers and tracking data (e.g., GPS location, position, orientation of the viewing device 101) related to the door 1110 may be determined by the viewing device 101 based on the picture 1106 of the door 1110 so as to identify the door 1110. The viewing device 101 communicates an identification of the identified door 1110 (and room location or any other scenery/local environment identifier) to the server 110. The server 110 retrieves a virtual object model associated with the identified door. The server 110 sends the virtual object model having a predefined behavior script to the viewing device 101. The viewing device 101 displays the visualization of the virtual object 1108 in relation to the picture 1106 of the door 1110 based on the predefined behavior script (e.g., virtual object 1108 to be rendered and displayed on the ground two feet to the left of the image of the door 1110).

Figure 11B:
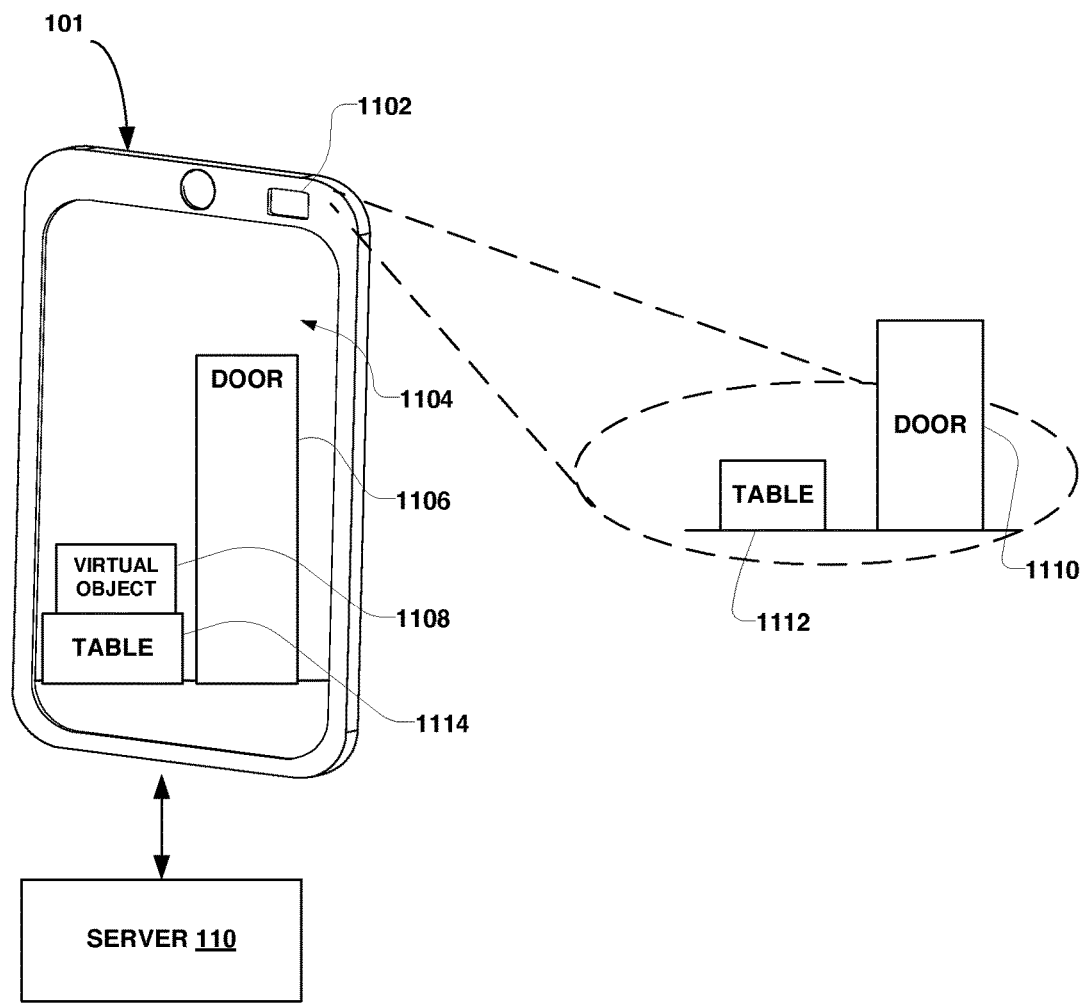
FIG. 11B is a diagram illustrating another example operation of adapting augmented reality content based on changes in real world space geometry.

FIG. 11B is a diagram illustrating an example operation of augmented reality content changes adapted to changes in real world space geometry. The viewing device 101 detects a change in the space geometry of the scenery (e.g., a table 1112 is placed next to the door 1110). As such, the viewing device 101 modifies the virtual object model based on the new space geometry. For example, the viewing device 101 may render and display the virtual object 1108 on top of an image 1114 of the table 1112.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 12:
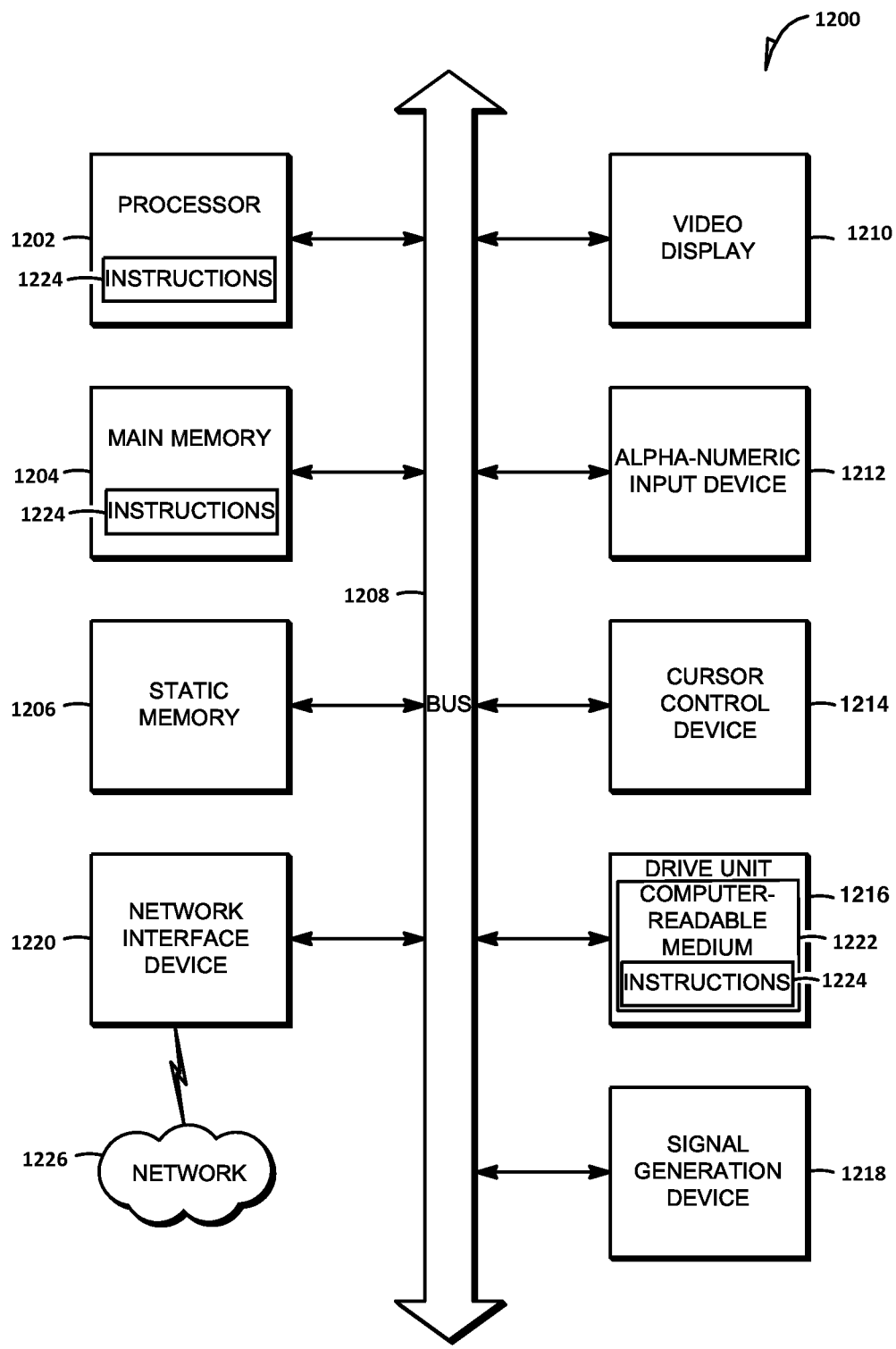
FIG. 12 is a block diagram illustrating components of a machine, according to some example embodiments, able to read instructions from a machine-readable medium and perform any one or more of the methodologies discussed herein.

FIG. 12 is a block diagram of a machine in the example form of a computer system 1200 within which instructions 1224 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation (or cursor control) device 1214 (e.g., a mouse), a disk drive unit 1216, a signal generation device 1218 (e.g., a speaker) and a network interface device 1220.

Machine-Readable Medium

The disk drive unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media. The instructions 1224 may also reside, completely or at least partially, within the static memory 1206.

While the machine-readable medium 1222 is shown in an example embodiment to be a single medium, the term "machine-readable medium" may include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Example Mobile Device

Figure 13:
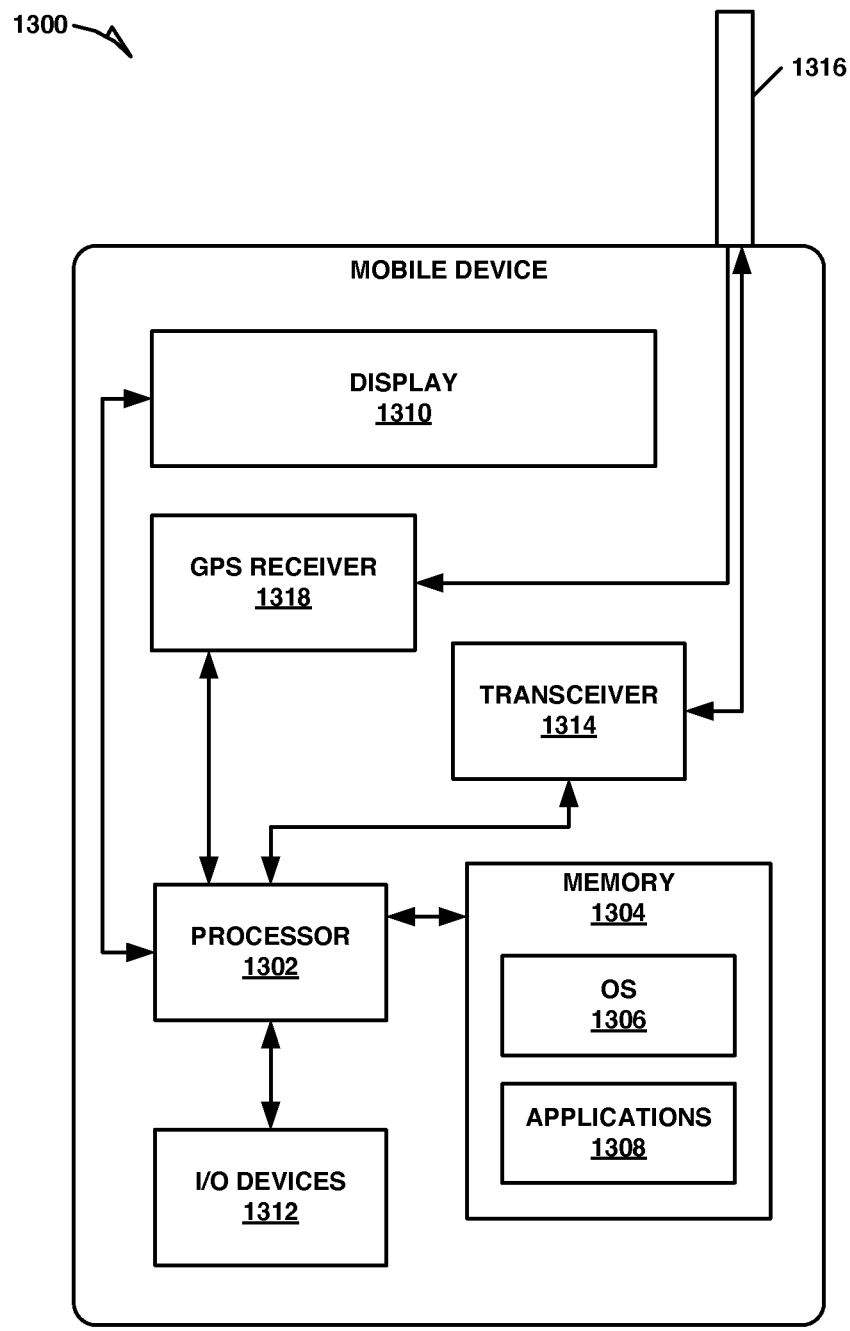
FIG. 13 is a block diagram illustrating a mobile device, according to an example embodiment.

FIG. 13 is a block diagram illustrating a mobile device 1300, according to an example embodiment. The mobile device 1300 may include a processor 1302. The processor 1302 may be any of a variety of different types of commercially available processors 1302 suitable for mobile devices 1300 (for example, an XScale architecture microprocessor, a microprocessor without interlocked pipeline stages (MIPS) architecture processor, or another type of processor 1302). A memory 1304, such as a random access memory (RAM), a flash memory, or other type of memory, is typically accessible to the processor 1302. The memory 1304 may be adapted to store an operating system (OS) 1306, as well as application programs 1308, such as a mobile location enabled application that may provide LBSs to a user. The processor 1302 may be coupled, either directly or via appropriate intermediary hardware, to a display 1310 and to one or more input/output (I/O) devices 1312, such as a keypad, a touch panel sensor, a microphone, and the like. Similarly, in some embodiments, the processor 1302 may be coupled to a transceiver 1314 that interfaces with an antenna 1316. The transceiver 1314 may be configured to both transmit and receive cellular network signals, wireless data signals, or other types of signals via the antenna 1316, depending on the nature of the mobile device 1300. Further, in some configurations, a GPS receiver 1318 may also make use of the antenna 1316 to receive GPS signals.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    capturing, by a head mounted viewing device, an image of a local environment;
    identifying, based on an analysis of the image of the local environment, a first physical object and a second physical object located in the local environment;
    determining, based on the analysis of the image, a location and physical size of the first physical object and a location and a physical size of the second physical object;
    generating, based on the location and the physical size of the first physical object in the local environment and the location and the physical size of the second physical object in the local environment, a physical layout of the local environment, the physical layout of the local environment defining a relative position of the first physical object and the second physical object within the local environment and the physical size of the first physical object and the physical size of the second physical object;
    comparing the physical layout of the local environment to a set of saved physical layouts stored in a memory of the viewing device, yielding a comparison, each saved physical layout defining relative positions and physical sizes of physical objects located in a respective local environment corresponding to the saved physical layout;
    determining, based on the comparison, that the physical layout of the local environment matches a first saved physical layout;
    retrieving a virtual object corresponding to the first saved physical layout;
    displaying the virtual object on a display of the head mounted viewing device;
    detecting that a new physical object has been added to the local environment;
    adjusting a position of the virtual object on the display in response to detecting the new physical object.

2. The method of claim 1, wherein the local environment comprises a scenery captured with an optical sensor.

3. The method of claim 1, wherein identifying the first physical object and the second physical object comprises:
    identifying feature points of the first physical object and the second physical object;
    identifying the first physical object and the second physical object based on the feature points of the first physical object and the second physical object.

4. The method of claim 1, further comprising:
    identifying a physical change in the local environment; and modifying the virtual object in response to the physical change.

5. The method of claim 4, wherein the physical change comprises at least one of a change in a location of a physical object within the local environment or a removal of a physical object from the local environment.

6. The method of claim 5, wherein modifying the content of the virtual object further comprises:
modifying a display and a behavior of the virtual object in response to the physical change.

7. The method of claim 6, wherein modifying the display and the behavior of the virtual object comprises:
modifying a size or shape of the virtual object on the display in relation to the physical change in the local environment; and
modifying a behavior of the virtual object in relation to the physical change in the local environment.

8. The method of claim 4, further comprising:
dynamically generating a new behavior for the virtual object in response to the physical change in the local environment using a library of virtual object alternative behaviors.

9. The method of claim 4, further comprising:
generating a physical change identifier in response to the physical change in the local environment;
communicating the physical change identifier to a server;
receiving from the server a new behavior model for the virtual object corresponding to the physical change identifier; and
modifying a behavior of the virtual object based on the new behavior model.

10. A non-transitory machine-readable medium comprising instructions that, when executed by one or more processors of a head mounted viewing device, cause the head mounted viewing device to perform operations comprising:
capturing an image of a local environment;
identifying, based on an analysis of the image of the local environment, at least a first physical object and a second physical object located in the local environment;
determining, based on the analysis of the image, a location and physical size of the first physical object and a location and a physical size of the second physical object;
generating, based on the location and the physical size of the first physical object in the local environment and the location and the physical size of the second physical object in the local environment, a physical layout of the local environment, the physical layout of the local environment defining a relative position of the first physical object and the second physical object within the local environment and the physical size of the first physical object and the physical size of the second physical object;
comparing the physical layout of the local environment to a set of saved physical layouts stored in a memory of the viewing device, yielding a comparison, each saved physical layout defining relative positions and physical sizes of physical objects located in a respective local environment corresponding to the saved physical layout;
determining, based on the comparison, that the physical layout of the local environment matches a first saved physical layout;
retrieving a virtual object corresponding to the first saved physical layout;
displaying the virtual object on a display of the head mounted viewing device;
detecting that a new physical object has been added to the local environment;
adjusting a position of the virtual object on the display in response to detecting the new physical object.

11. A head mounted viewing device comprising:
one or more computer processors; and
one or more computer-readable mediums storing instructions that, when executed by the one or more computer processors, cause the head mounted viewing device to perform operations comprising:
capturing an image of a local environment;
identifying, based on an analysis of the image of the local environment, at least a first physical object and a second physical object located in the local environment;
determining, based on the analysis of the image, a location and physical size of the first physical object and a location and a physical size of the second physical object;
generating, based on the location and the physical size of the first physical object in the local environment and the location and the physical size of the second physical object in the local environment, a physical layout of the local environment, the physical layout of the local environment defining a relative position of the first physical object and the second physical object within the local environment and the physical size of the first physical object and the physical size of the second physical object;
comparing the physical layout of the local environment to a set of saved physical layouts stored in a memory of the viewing device, yielding a comparison, each saved physical layout defining relative positions and physical sizes of physical objects located in a respective local environment corresponding to the saved physical layout;
determining, based on the comparison, that the physical layout of the local environment matches a first saved physical layout;
retrieving a virtual object corresponding to the first saved physical layout;
displaying the virtual object on a display of the head mounted viewing device;
detecting that a new physical object has been added to the local environment;
adjusting a position of the virtual object on the display in response to detecting the new physical object.

12. The head mounted viewing device of claim 11, wherein the local environment comprises a scenery captured with an optical sensor.

13. The head mounted viewing device of claim 11, wherein identifying the first physical object and the second physical object comprises:
identifying feature points of the first physical object and the second physical object;
identifying the first physical object and the second physical object based on the feature points of the first physical object and the second physical object.

14. The head mounted viewing device of claim 11, the operations further comprising:
identifying a physical change in the local environment; and
modifying the virtual object in response to the physical change.

15. The head mounted viewing device of claim 14, wherein the physical change comprises at least one of a change in a location of a physical object within the local environment or a removal of a physical object from the local environment.

16. The head mounted viewing device of claim 15, wherein modifying the content of the virtual object further comprises:
modifying a display and a behavior of the virtual object in response to the physical change.

17. The head mounted viewing device of claim 16, wherein modifying the display and the behavior of the virtual object comprises:
modifying a size or shape of the virtual object on the display in relation to the physical change in the local environment; and
modifying a behavior of the virtual object in relation to the physical change in the local environment.

18. The head mounted viewing device of claim 14, the operations further comprising:
dynamically generating a new behavior for the virtual object in response to the physical change in the local environment using a library of virtual object alternative behaviors.

19. The head mounted viewing device of claim 14, the operations further comprising:
generating a physical change identifier in response to the physical change in the local environment;
communicating the physical change identifier to a server;
receiving from the server a new behavior model for the virtual object corresponding to the physical change identifier; and
modifying a behavior of the virtual object based on the new behavior model.

* * * * *